United States Patent
Redekop et al.

(10) Patent No.: US 7,008,315 B2
(45) Date of Patent: Mar. 7, 2006

(54) VENTING OF A COMBINE HARVESTER

(75) Inventors: Leo Redekop, Saskatoon (CA); Kevin Redekop, Saskatoon (CA); Dean Mayerle, Saskatoon (CA)

(73) Assignee: Redekop Chaff Systems Ltd., Saskatoon (CA)

( * ) Notice: Subject to any disclaimer, the term of this patent is extended or adjusted under 35 U.S.C. 154(b) by 0 days.

(21) Appl. No.: 10/831,358

(22) Filed: Apr. 26, 2004

(65) Prior Publication Data
US 2005/0245301 A1 Nov. 3, 2005

(51) Int. Cl.
*A01F 12/40* (2006.01)
(52) U.S. Cl. .................................................. 460/112
(58) Field of Classification Search ............... 460/99, 460/100, 103, 111, 112, 119
See application file for complete search history.

(56) References Cited

U.S. PATENT DOCUMENTS

| | | | |
|---|---|---|---|
| 3,402,720 A * | 9/1968 | Rowland-Hill | 460/100 |
| 4,056,107 A | 11/1977 | Todd et al. | |
| 4,160,487 A * | 7/1979 | Kunze et al. | 180/68.4 |
| 4,412,549 A | 11/1983 | Rowland-Hill | |
| 4,637,406 A | 1/1987 | Guinn et al. | |
| 4,711,253 A * | 12/1987 | Anderson | 460/100 |
| 5,021,028 A * | 6/1991 | Kersting et al. | 460/85 |
| 5,317,860 A * | 6/1994 | Dunn | 56/12.8 |
| 5,501,635 A * | 3/1996 | Niermann | 460/112 |
| 5,595,537 A * | 1/1997 | Jungemann et al. | 460/100 |
| 5,833,533 A * | 11/1998 | Roberg | 460/112 |
| 6,113,491 A * | 9/2000 | Holmen | 460/111 |
| 6,558,252 B1 * | 5/2003 | Visagie et al. | 460/99 |
| 6,656,038 B1 | 12/2003 | Persson | |
| 2002/0086722 A1 * | 7/2002 | Kuhn et al. | 460/100 |
| 2004/0176150 A1 * | 9/2004 | Gryspeerdt et al. | 460/112 |
| 2004/0176151 A1 * | 9/2004 | Gryspeerdt et al. | 460/112 |

* cited by examiner

*Primary Examiner*—Árpád Fábián Kovács
(74) *Attorney, Agent, or Firm*—Adrian D. Battison; Michael R. Williams; Ryan W. Dupuis (57) ABSTRACT

A combine harvester with a straw separating system and a sieve assembly below the straw separation system with a rear edge over which the chaff is discharged in the air flow has a housing with a rear hood behind the straw separating system and behind the rear edge of the sieve assembly with a bottom opening in the hood for discharge of the straw and the lighter materials. A straw chopper is mounted at the rear hood for receiving the straw and lighter materials and has a rotor for chopping the straw and for generating a stream of air and chopped straw for spreading the chopped straw. At least one vent opening with upwardly and outwardly inclined louvers is provided at the rear hood, either in the hood itself or in the side walls of the chopper housing, arranged to cause air from the sieve assembly to move rearwardly from the rear edge into the rear hood and to discharge from the rear hood through the at least one opening or allow air to be drawn in to satisfy the chopper requirements if the sieve airflow is lower. A fan can be provided to draw air from the opening and to supplement the air stream from the chopper.

40 Claims, 8 Drawing Sheets

VENTING OF A COMBINE HARVESTER

This invention relates to a combine harvester and to arrangements for reducing the pressure differential between the internal body of the combine harvester and the exterior.

BACKGROUND OF THE INVENTION

Combine development in recent years have put greater demands on the straw choppers and chaff spreaders. The main reasons are that larger combines and wider cutting widths are creating higher flows of straw and chaff; wider cutting widths create more demanding spreading widths; reduced tilling practices have put more demand on even spreading of both straw and chaff and that plant breeding has resulted in tougher straw, higher yields and more residue.

Large capacity combines have remained the same physical size as previous models. This means that a greater flows of grain, chaff and straw are moving through the same sized cavities. For this reason, greater mass flows of air are required to separate the chaff and grain on the sieves and in advanced straw chopping systems, a greater volume of air is being pressurized to spread the residue wider. This means that there must be a large exhaust/inlet area to balance the airflow so that the combine hood will not pressurize and effect grain separation.

As combines get larger and more compact the distance between the end of the sieve and the straw chopper is shrinking as this space is sacrificed for other options. The space between the chopper and the sieve end typically is the area where air pressure is balanced. Reduction of and enclosing of this space has the potential to create problems with the airflow off of the sieves and therefore alter the grain sample—leaving poorly separated grain or a dirty sample.

Typically the airflow off the sieves carries the chaff and light partials into a chaff spinner or straw chopper. The airflow trajectory needs to remain substantially rearward so it will not create vortices or non laminar flow across the sieves with the potential of creating a dirty sample.

The current John Deere STS combine is perhaps the most extreme example of a compact machine. In this case Deere has added a small opening in the sidewall of the combine, nearly perpendicular to the end of the sieves and substantially immediately at the end of the sieves. Although in one condition this does relieve some air pressure, the placement of the opening interferes with the proper operation of the sieves in that the air from the sieves must make a substantially immediate 90-degree turn as it comes off of the sieves. This leads to vortices on the sieves and ultimately to areas of the sieves that contribute to a poor grain sample. Inversely, when the chopper is demanding more air than is being supplied by the sieve fan the air must be drawn in from a location near the sieves which again leads to vortices on the sieves and ultimately to areas of the sieves that contribute to a poor grain sample.

At this time no other solution is available which will allow the large amount of air exiting/drawn in the rear of the sieves to escape/enter the combine.

U.S. Pat. No. 4,412,549 (Rowland Hill) issued November 1983 and U.S. Pat. No. 6,558,252 (Visagie) issued May 2003 both disclose air flow arrangements which improve separation at the sieve in the combine harvester.

SUMMARY OF THE INVENTION

It is one object of the invention to provide an improved combine harvester and/or an apparatus which can be used with a combine harvester in which the air flow is not compromised.

According to one aspect of the invention there is provided a combine harvester comprising:

a housing;

a straw separating system mounted within the housing for separating seed materials from straw for collection of the seed materials and for transport of the straw rearwardly toward a rear of the housing for discharge;

the housing having a rear hood with a bottom opening in the hood for discharge of the straw and the lighter materials;

a straw chopper mounted at the rear hood for receiving the straw and having a rotor for chopping the straw and for generating a stream of chopped straw for spreading the chopped straw and at least one vent opening at the rear hood arranged to allow air to pass between the rear hood and the exterior through the at least one opening.

In some cases the chopper is of the type which generates an air stream with the straw so that some or in many case the majority of the air is carried through the chopper. However this is not the case with many choppers used today which do not generate an air flow such as straight blade choppers. Thus in this case, the vent opening or openings allow excess air which cannot be drawn away by the chopper to escape without causing back pressure in the hood. In the case of the air flow choppers, the vents can be used to allow airflow into the chopper to satisfy the air requirements of the chopper without airflow being drawn from the sieves, which can interfere with the proper operation of the sieves.

In most cases the arrangement includes a sieve assembly mounted within the housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow and the chopper and the vents are arranged rearwardly of the sieve assembly.

In one arrangement, the at least one vent opening is located in the hood adjacent the straw chopper.

In this case, preferably the at least one vent opening includes a first and a second vent opening each arranged in a respective side wall of the hood adjacent the straw chopper.

In another arrangement, the straw chopper has a housing attached to the hood and the at least one vent opening is located in the chopper housing.

In this case, preferably the chopper housing includes two side walls and wherein there is a vent opening in each side wall.

In this case, preferably the side wall includes a mounting flange at its top edge for attachment to the bottom of the hood and wherein the vent openings include a plurality of horizontal slots at spaced positions directly below the mounting flange. It should be noted that there are a number of different ways to vent a chopper to someone skilled in the art such as formed holes like a cheese grater where the object is to let the air out or in while not allowing the residue out or allowing the residue to plug the vent.

In this case, preferably the chopper housing includes a rear wall extending transversely across the hood and wherein there is a vent opening in the rear wall.

In this case, preferably the rear wall is mounted below the bottom of the hood and the vent openings include a plurality of horizontal slots at spaced positions directly below the hood.

Preferably the at least one vent opening includes a plurality of louvers and the louvers are arranged such that they are inclined upwardly and outwardly so as to be angled opposite of the downward direction of flow of the straw. One skilled in the art will understand that the orientation of the vents may be other than horizontal due to the trajectory of the flow of the straw so that the vents which define slots have the length of the slot generally at right angles to the trajectory of the straw to reduce the possibility of the straw projecting through the slots.

In one optional arrangement, there is provided a pneumatic fan having a duct connected to the at least one vent opening for driving air through the at least one vent opening. The fan may be arranged such that the duct is either an inlet to or an outlet from the fan to drive the air either inwardly or outwardly depending upon requirements.

In this case, preferably the fan has an outlet duct which transports the air from the fan to be mixed with the stream of air and chopped straw.

According to a second aspect of the invention there is provided for use in mounting on a combine harvester having: a housing; a straw separating system mounted within the housing for separating seed materials from straw for collection of the seed materials and for transport of the straw rearwardly toward a rear of the housing for discharge; the housing having a rear hood with a bottom opening in the hood for discharge of the straw;

an apparatus comprising a straw chopper having a housing arranged to be mounted at the rear hood for receiving the straw and lighter materials and a rotor mounted in the housing for chopping the straw and for generating a stream of air and chopped straw for spreading the chopped straw;

the housing having at least one vent opening arranged to cause air from the sieve assembly to move rearwardly from the rear edge into the rear hood and to discharge from the rear hood through the at least one opening.

The arrangement defined above thus provides additional air exhausting locations substantially close to the straw chopper. Thus the airflow carries the straw and chaff to the chopper and then the air is exhausted. Thus air flows through the sieve with the trajectory remaining substantially rearward so that the grain sample is not compromised.

According to a third aspect of the invention there is provided an apparatus for mounting on a combine harvester having: a housing; a straw separating system mounted within the housing for separating seed materials from straw for collection of the seed materials and for transport of the straw rearwardly; the housing having a rear hood behind the straw separating system and the straw chopper with a bottom opening in the hood for discharge of the straw and the lighter materials;

the apparatus comprising a straw chopper having a housing arranged to be mounted directly below the straw separation system for receiving the straw and lighter materials and a rotor mounted in the housing for chopping the straw and for generating a stream of air and chopped straw for spreading the chopped straw;

the housing having at least one vent opening arranged to allow air from outside the combine harvester to be drawn into the housing to supply air for discharge with the chopped material to move rearwardly from the chopper discharge into the rear hood and to discharge from the rear hood.

The arrangement defined above thus provides additional air inlet locations forward of the inlet of straw chopper. Thus the airflow carries the lighter materials and directs the straw into the chopper and then the air is exhausted. Thus lighter materials do not fall to the sieve, they are discharge with the straw leaving the sieve with more capacity.

An alternate embodiment of the third aspect of the invention includes the internal chopper with at least one vent mounted within the rotational tip diameter of the fan blades of the chopper—when in a side elevational view. Some threshing systems are very susceptible to air movement in the straw separation zone, therefore we need to eliminate airflow into the inlet of the chopper. The inlet allows air to be drawn from outside of the threshing cavity, to be pressurized and exhausted inside the threshing cavity along with the chopped material to move rearwardly from the chopper discharge into the rear hood and to discharge from the rear hood with substantial velocity to produce a wide spread.

According to a further aspect of the invention there is provided a combine harvester comprising:

a housing;

a straw separating system mounted within the housing for separating seed materials from straw for collection of the seed materials and for transport of the straw toward the outlet of the housing for discharge;

a sieve assembly mounted within the housing below the straw separation system for receiving the seed materials and for separating from the seed materials heavier seeds which fall through the sieve assembly for collection and lighter materials, the sieve assembly having an air flow system for generating an air flow through the sieve assembly and a rear edge over which the lighter materials are discharged in the air flow;

the housing having a rear hood with an opening in the hood for discharge of the straw and the lighter materials;

a straw chopper mounted at the hood for receiving the straw and lighter materials for chopping the straw and for generating a stream of chopped straw for spreading the chopped straw;

the straw chopper having a transverse hub rotatable about a transverse axis and carrying a plurality of axially spaced blades for rotation with the hub about the axis so as to define an imaginary vertical plane parallel to and in front of the axis which is the forwardmost plane which tips of the blades reach;

and at least one vent opening having at least a portion thereof rearward of said imaginary vertical plane and arranged to allow air to pass between the rear hood and the exterior through the at least one vent opening.

BRIEF DESCRIPTION OF THE DRAWINGS

FIG. 6 is a top plan view of the chopper of FIG. 3 showing a duct and fan arrangement for transporting the vented air.

DETAILED DESCRIPTION

Figure 1:
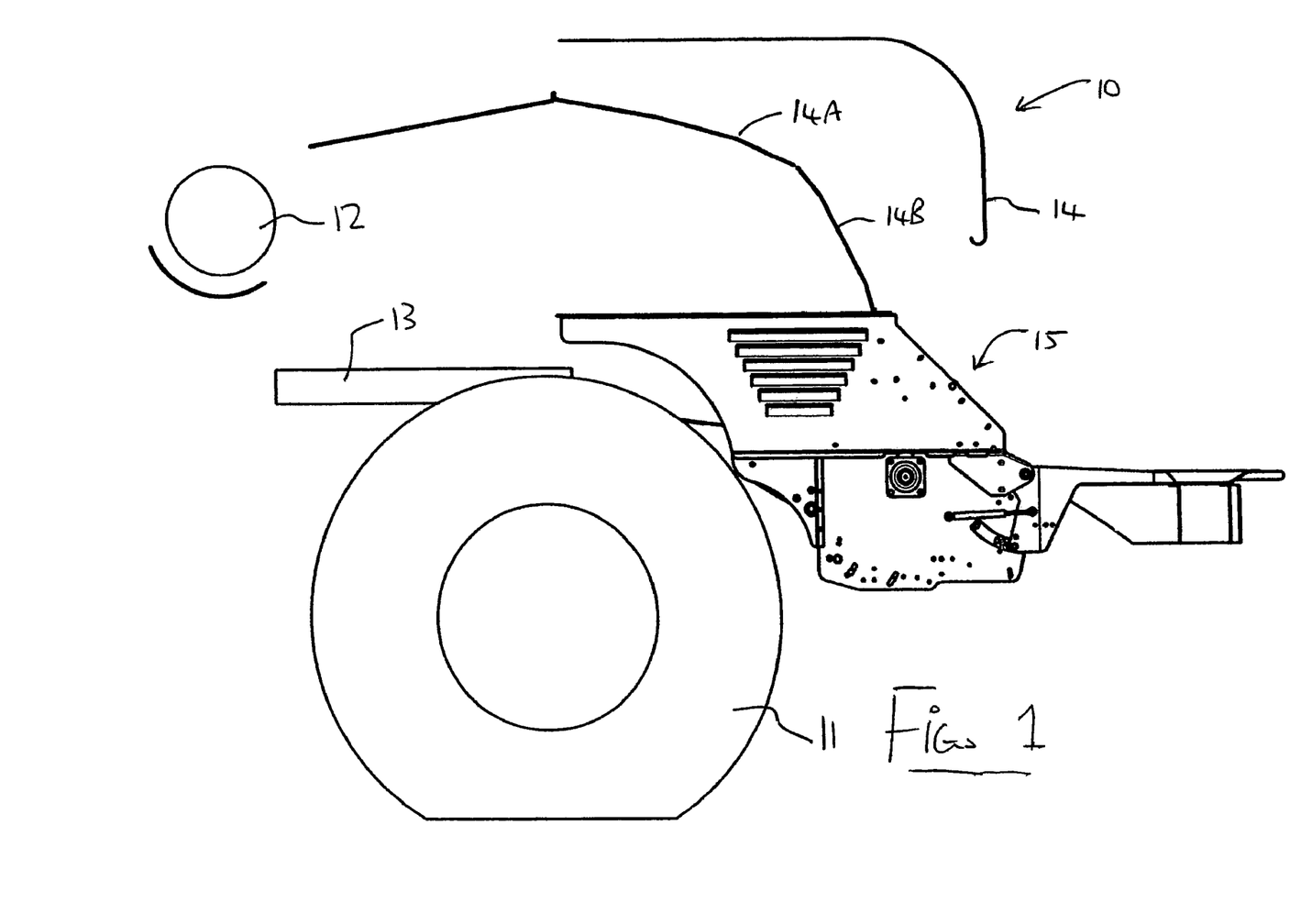
FIG. 1 is a schematic side elevational view of a combine harvester and straw chopper according to the present invention.

A combine harvester shown in FIG. 1 comprises a combine harvester housing 10 mounted on ground wheels 11 for transport over a ground in conventional manner. The combine harvester is shown only schematically since many different designs are available and well known to one skilled in the art. The combine harvester includes a straw separation section generally indicated at 12 and a sieve section generally indicated at 13. Again these elements are conventional and provide arrangements for separation of the straw from the crop material allowing the seed material to fall through to the sieve at which seeds are separated from the seed material leaving the chaff or other lighter materials on top of the sieve to be carried away from the sieve by an air flow through the sieve as is well known.

The rear of the combine is provided is a rear hood 14 into which air from the straw separation system and the sieves enters and into which straw is discharged rearwardly for and is guided by guide wall 14A and by operable guide panel 14B in the hood section 14 into a chopper and spreader generally indicated at 15.

This arrangement is well known and commercial products are readily available from Redekop Manufacturing and other manufacturers of straw choppers of this type.

Figure 2:
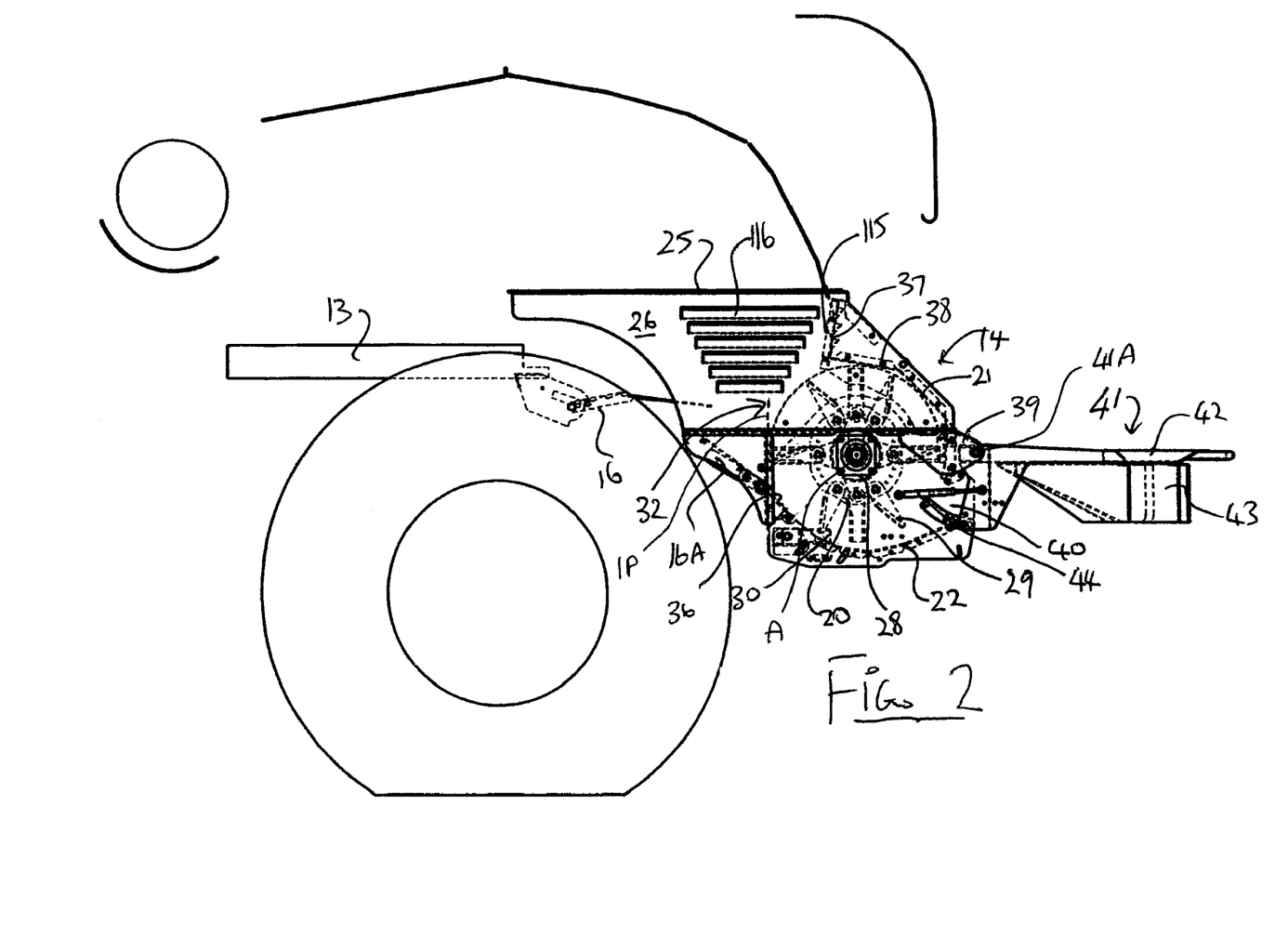
FIG. 2 is a schematic side elevational view similar to that of FIG. 1 showing the internal components in phantom.

The chaff from the rear end of the sieve as best shown in FIG. 2 at 13 is carried by a movable pan 16 and a chaff control door 16A into the inlet 32 of the chopper 15.

An example of a chopper of this type is disclosed in U.S. Pat. No. 6,478,674 issued Nov. 12, 2002, U.S. Pat. No. 5,482,508 issued Jan. 9, 1996 and U.S. Pat. No. 5,232,405 issued Aug. 3, 1993 all of Leo Redekop, and U.S. application 2002/0004417 published Jan. 10, 2002 the disclosures of which are incorporated herein by reference.

The chopper has a horizontal upper mounting flange 25 which attaches to a corresponding bottom flange of the hood of the combine. This forms a rectangular open mouth at the top of the chopper which corresponds in shape to the rectangular lower opening of the hood so that all material discharging from the guide walls 14A and 14B falls into the upper part of the housing and enters the inlet 32 of the chopper.

The chopper comprises a housing attached to the top mounting flange and depending therefrom and defined by side walls 26 at opposite sides of the hood and generally co-planar therewith. Bridging the side walls 26 is provided a bottom wall 22 and a top wall 21 which extend across the width of the chopper and form a generally cylindrical containing surface for receiving the chopper rotor 20. The rotor 20 includes a hub 28 with a plurality of radially extending flails or blades 29 carried on the rotor for rotation therewith around the axis of the rotor which is arranged across the width of the chopper.

Many different arrangements and construction of blades can be used as are well known to one skilled in the art and described in the above patents of Redekop. In most cases the chopper includes stationary blades 30 mounted on the bottom wall 22 at a position partway around the bottom wall. The stationary blades are arranged in a row at spaced positions across the width of the chopper so as to co-operate with the rotating blades of the hub in a chopping action. The spacing between the blades can be selected in accordance with the type of rotating blades as is well known to one skilled in the art.

The top wall 21 and the bottom wall 22 define at the upper part of the housing the inlet 32 into which the straw can be guided from the hood and from the sieve 13. The chaff guide plate 16 and control door 16A carry the chaff from the end of the sieve over the space between the end of the sieve and the front edge 36 of the bottom wall 22 so as to carry the chaff in the air stream from the sieve over the plate and into the opening 32.

In the configuration shown, the top wall 21 includes a generally vertical portion 37 which extends downwardly from the top flange 25 to the top of the rotor. The top wall 21 further includes a curved section 38 which extends around the top of the rotor to a rear edge 39 which defines the top edge of the rear discharge opening 40 through which the material exits in the stream of air and chopped materials generated by the rotation of the rotor within the housing.

A tailboard 41 is pivotally mounted on the rear part of the housing at a pivot mount 41A. The tailboard comprises a base plate 42 with a series of fins 43 on the underside shaped and arranged so that material exiting from the discharge opening 40 is thrown up against the underside of the tailboard and impacts the fins causing a change in direction of the material on the tailboard so as to spread the material using the momentum generated in the stream from the rotor. The angle of the tailboard can be adjusted around the pivot 41A by positioning a spring loaded pin. The load of the tailboard is counteracted with a gas cylinder 44.

Figure 3:
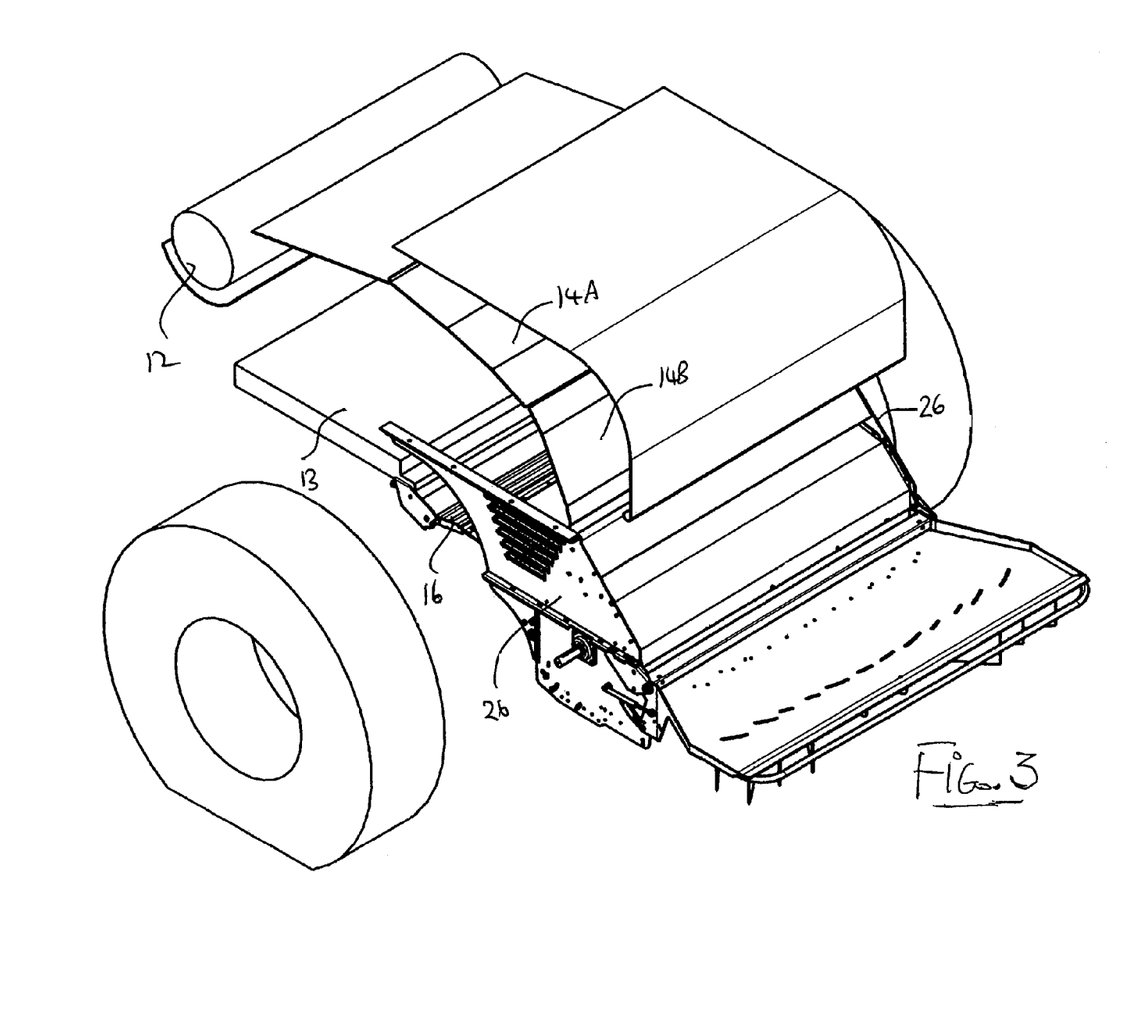
FIG. 3 is an isometric view of the straw chopper and combine of FIG. 1.
Figure 4:
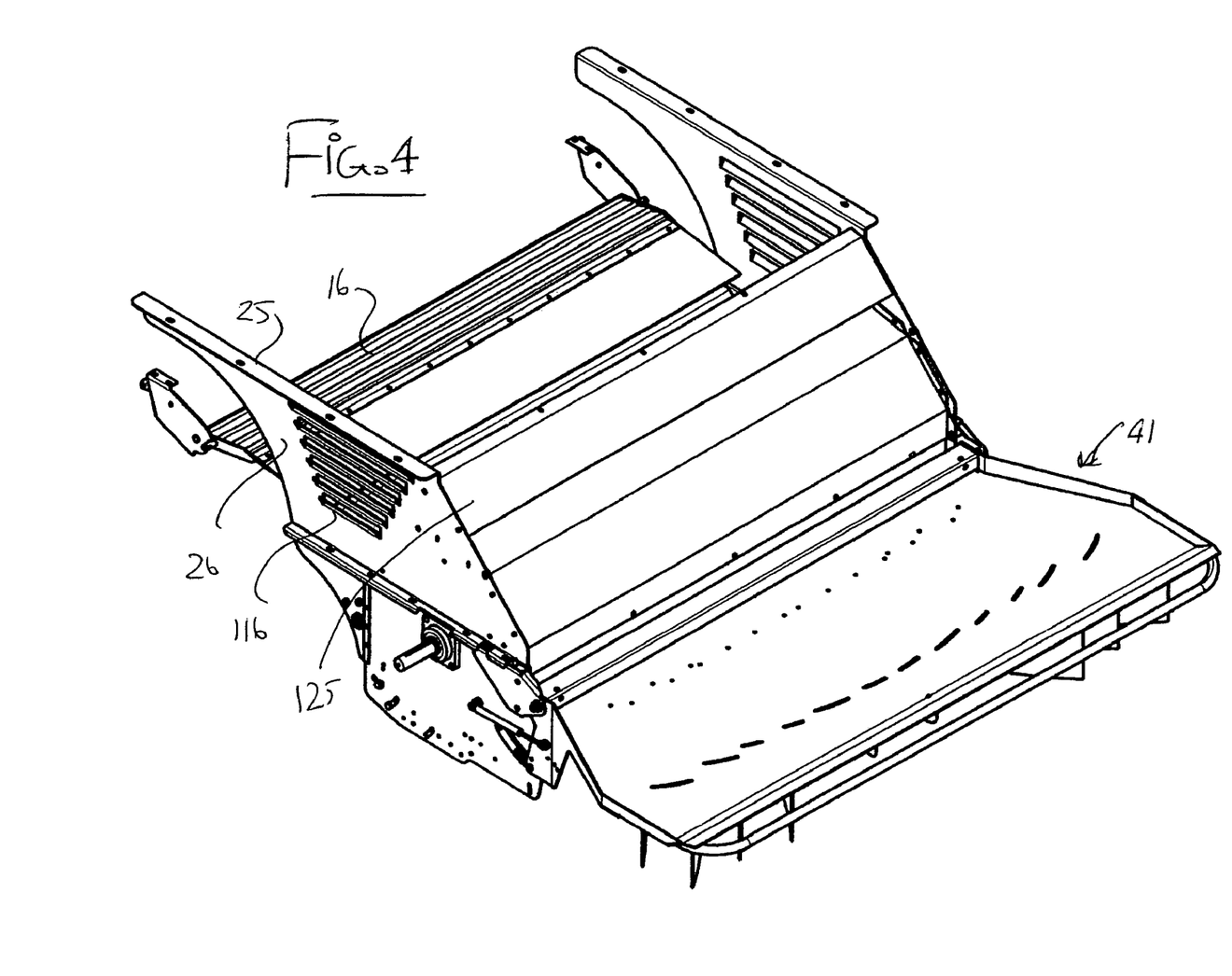
FIG. 4 is an isometric of the chopper alone and including a rear vent cover.
Figure 5:
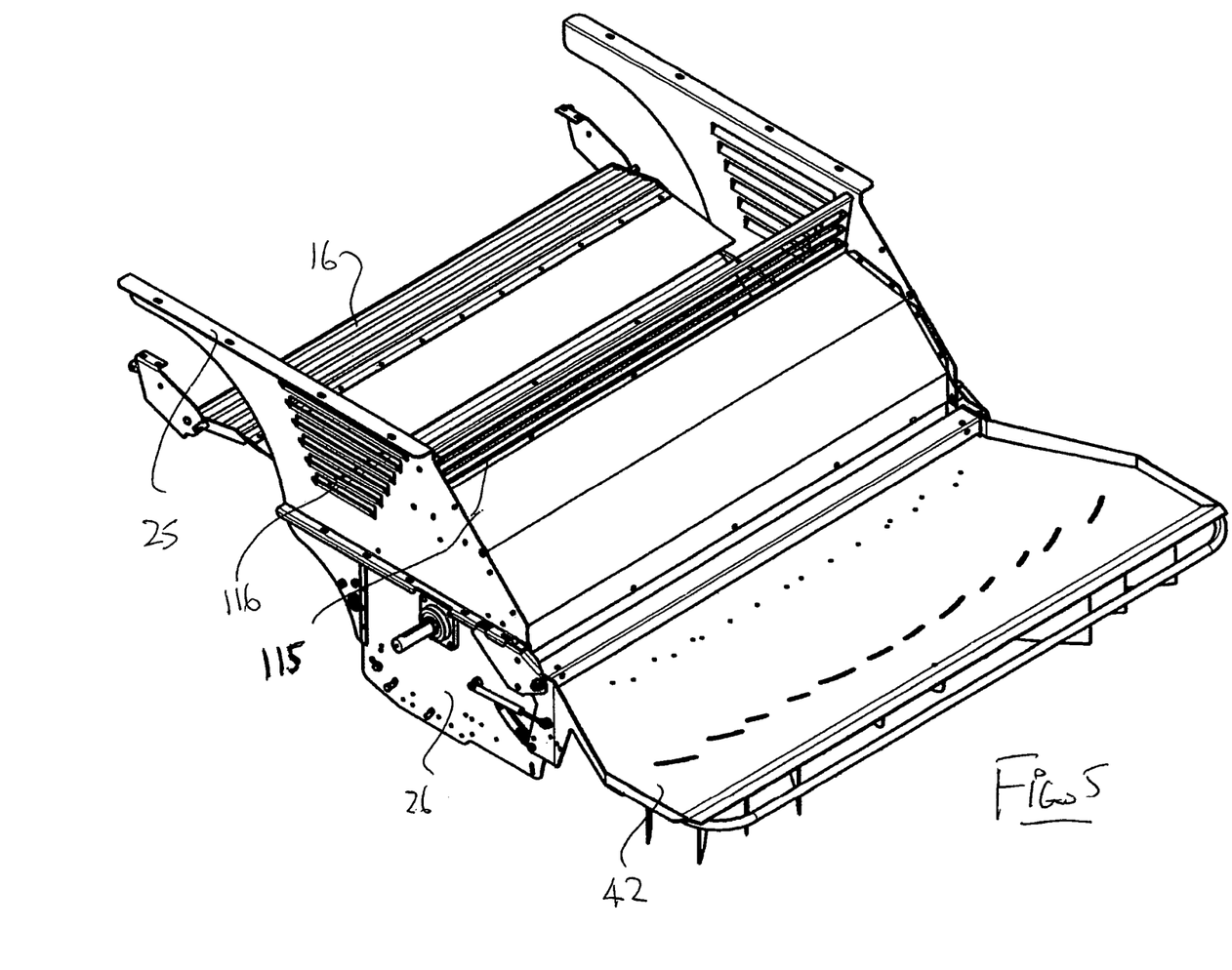
FIG. 5 is a similar isometric view showing an arrangement with vent openings both in the rear wall and side walls of the chopper housing, with the rear vent cover removed.

Rear vents 115 and side vents 116 are provided in the chopper housing. In FIGS. 3 and 4 the rear vents 115 are covered by an inclined rear cover panel 125 which is removable. In this configuration the vents form a series of horizontal parallel slots in the side wall with the first immediately at the top mounting flange. The vents consist of louvers that are angled outwards and upwards, as best shown in the isometric views, so as to be opposite to the downwards direction of the straw flow path. This is necessary to eliminate straw from plugging the vent holes. The vents can be provided solely in the side walls of the chopper housing or can be provided solely in the rear wall or in both. The vents are above and forward of the inlet 32 so as to act on the air in advance of the materials entering the inlet of the chopper. As shown in FIG. 2, the straw chopper has a transverse hub rotatable about a transverse axis and carrying a plurality of axially spaced blades for rotation with the hub about the axis so as to define an imaginary vertical plane marked at IP parallel to and in front of the axis A which is the forwardmost plane which tips of the blades 29 reach.

The side vent openings 116 have at least a portion thereof rearward of the imaginary vertical plane IP and arranged to allow air to pass between the rear hood and the exterior through the at least one vent opening. Thus each slot defining the vent openings includes a part of the slot which is rearward of the plane IP and part in front. The slots at the top are longer so as to include a longer part rearward. The slots are symmetrical about a center line so that they gradually become shorter from the uppermost slot at the flange 25 to the bottom slot blow the top of the rotor.

The vents are located above the chopper rotor and particularly above the inlet thereto so that the air which is not drawn into the inlet because of pressurization in the hood can escape through the vents. Inversely, if the chopper is drawing more air than is being supplied by the sieves, air will be drawn in, through the vents, thereby not limiting the chopper's performance and also not drawing additional air from the sieves and grain with it.

Figure 7:
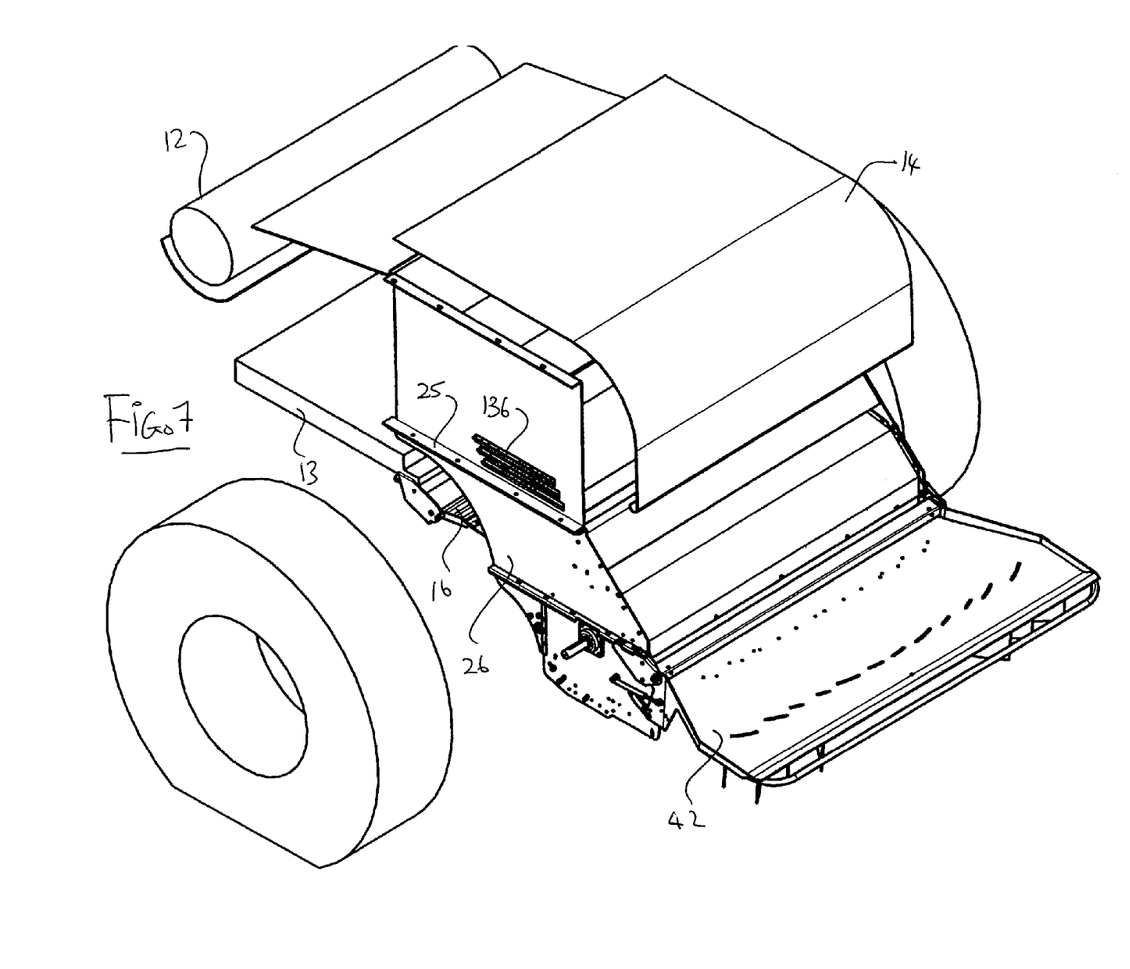
FIG. 7 is an isometric view similar to that of FIG. 3 showing an arrangement in which the vent opening are in the side walls of the rear hood.

It is important to note that the vents do not need to be in the chopper housing. The vents can be placed in the hood of the combine substantially close to the chopper or immediately above the mounting flange of the chopper as shown at vents 136 in FIG. 7. The air should be vented/drawn-in as close as possible to the chopper so that the air moving rearwardly from the rear end of the straw separation system and rearwardly from the rear edge of the sieve assembly carries the chaff and straw to the chopper assembly.

The vents also may be partly in the hood and partly in the chopper. As shown the vents are preferably louvers but there could be many possible shapes such as round like a cheese grater. The important part of the construction is that there is a void to allow air either in or out, with some mechanism to stop the straw from coming out or it plugging in the void. The holes are preferably oriented perpendicular to the direction of the straw flow so as to better control the escape of air without allowing straw to enter the vent with the potential of plugging.

As shown in FIG. 6 the vents in the side wall are connected to the inlet duct 145 of a pneumatic fan 150 mounted to draw air out of the combine hood thereby reducing the pressurized effect. The outlet of the fan provides pressurized air to a duct 151 which increases in width to a slot 152 at the discharge 40 to assist in providing an increased air flow from the discharge over the fins of the tailboard for spreading. Reference is made to co-pending PCT Application Serial Number PCT CA04/001599 which is based on Canadian; Application 2440082 filed Sep. 9, 2003, which discloses the use of a fan to generate air flow boost to be supplied to the chopper and the intake duct shown in FIG. 1 can be used with such a fan to provide additional air for the discharge of the chopper.

Figure 8:
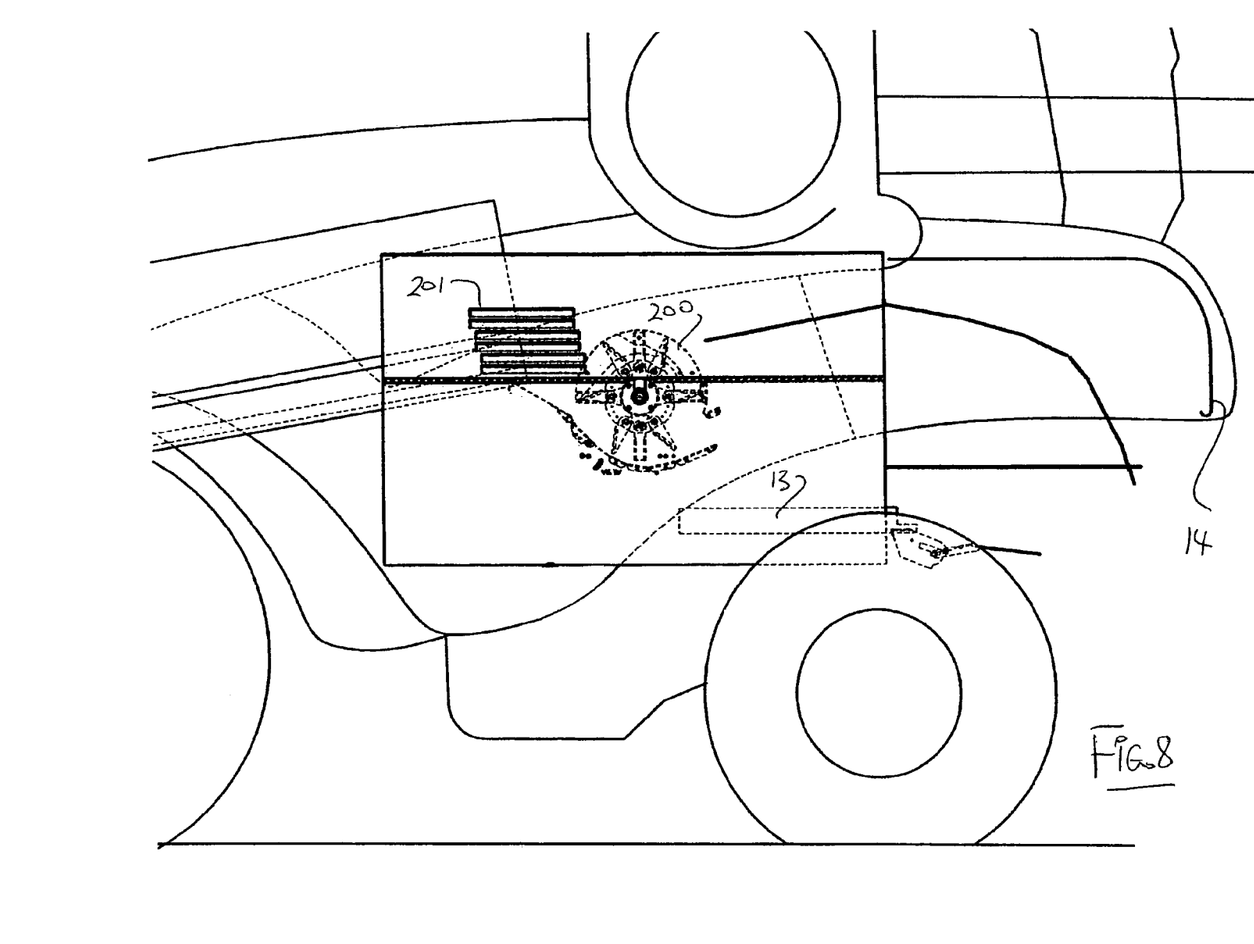
FIG. 8 is a side elevational view of an arrangement using an internal chopper in which the vent openings are arranged in the side walls of the chopper.
Figure 9B:
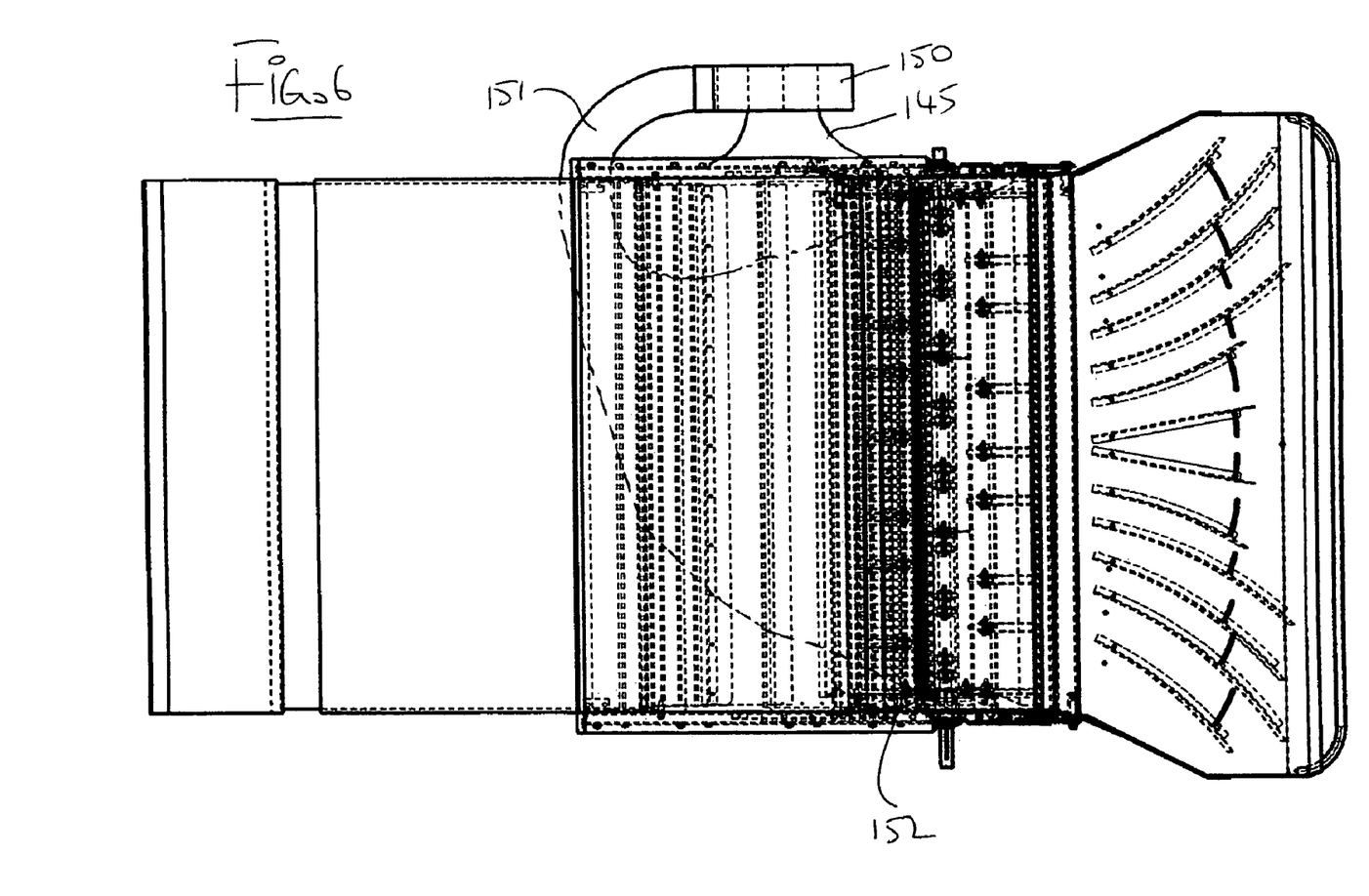

As shown in FIG. 8 an alternative conventional arrangement well known to one skilled in the art is shown where an internal chopper 200 is provided in the combine body above the sieve 13 and in front of the hood 14. This arrangement has inlet openings corresponding to the inlet openings 201 described herein located in relation to the chopper and constructed as previously described.

Since various modifications can be made in my invention as herein above described, and many apparently widely different embodiments of same made within the spirit and scope of the Claims without department from such spirit and scope, it is intended that all matter contained in the accompanying specification shall be interpreted as illustrative only and not in a limiting sense.

The invention claimed is:

1. A combine harvester comprising:
   a housing;
   a straw separating system mounted within the housing for separating seed materials from straw for collection of the seed materials and for transport of the straw rearwardly toward a rear of the housing for discharge;
   the housing having a rear hood with walls defining a hollow interior, and separating the hollow interior from an exterior of the combine harvester, into which hollow interior straw is fed from the separating system and with a bottom opening in the rear hood for discharge of the straw from the hollow interior of the rear hood;
   a straw chopper mounted at the rear hood for receiving the straw from the hollow interior of the rear hood;
   the straw chopper having a generally cylindrical rotor with a hub mounted for rotation about a horizontal axis and carrying blades for chopping the straw and for generating an air stream for spreading the chopped straw;
   the straw chopper having a chopper housing defining an inlet opening at the rotor for receiving straw moving downstream from the hollow interior of the rear hood and an outlet opening angularly spaced around the rotor from the inlet opening for discharge of the chopped straw in the air stream;
   and at least one vent opening arranged to allow air to pass between the hollow interior of the rear hood at a position upstream of the inlet opening and the exterior through said at least one vent opening.

2. The combine harvester according to claim 1 wherein the at least one vent opening is located in a wall of the rear hood adjacent the straw chopper.

3. The combine harvester according to claim 1 wherein the at least one vent opening includes a first and a second vent opening each arranged in a respective side wall of the rear hood adjacent the straw chopper.

4. The combine harvester according to claim 1 wherein the chopper housing includes housing walls attached to the rear hood and depending therefrom and wherein the at least one vent opening is located in a respective one of the chopper housing walls.

5. The combine harvester according to claim 4 wherein the chopper housing walls include two side walls and wherein there is a respective one of the vent openings in each side wall.

6. The combine harvester according to claim 4 wherein the chopper housing walls each include a mounting flange at its top edge for attachment to the bottom of the hood and wherein the at least one vent opening includes a plurality of horizontal slots at spaced positions directly below the mounting flange.

7. The combine harvester according to claim 1 wherein the chopper housing includes a rear wall extending transversely across the rear hood and wherein the at least one vent opening includes a vent opening in the rear wall.

8. The combine harvester according to claim 7 wherein the vent opening in the rear wall include a plurality of horizontal slots.

9. The combine harvester according to claim 1 wherein the at least one vent opening includes a plurality of louvers.

10. The combine harvester according to claim 9 wherein the louvers are arranged such that they are inclined upwardly and outwardly so as to be angled opposite of to the downward direction of flow of the straw.

11. The combine harvester according to claim 1 wherein the there is provided a pneumatic fan having a duct connected to the at least one vent opening for driving air through the at least one vent opening.

12. The combine harvester according to claim 11 wherein the fan has an outlet duct which transports the air from the fan to be mixed with the air stream from the rotor.

13. Apparatus for mounting on a combine harvester having: a housing; a straw separating system mounted within the housing for separating seed materials from straw for collection of the seed materials and for transport of the straw rearwardly toward a rear of the housing for discharge; the housing having a rear hood with a bottom opening in the hood for discharge of the straw and the lighter materials;
   the apparatus comprising a straw chopper having a housing arranged to be mounted at the rear hood for receiving the straw, the housing having walls for attachment to the rear hood so as to depend therefrom:

the straw chopper having a generally cylindrical rotor with a hub mounted for rotation about a horizontal axis and carrying blades for chopping the straw and for generating an air stream for spreading the chopped straw;

the chopper housing defining an inlet opening at the rotor for receiving straw moving downstream from the hollow interior of the rear hood and an outlet opening angularly spaced around the rotor from the inlet opening for discharge of the chopped straw in the air stream;

and at least one vent opening in at least one of the walls of the chopper housing arranged to allow air to pass between the hollow interior of the rear hood at a position upstream of the inlet opening and the exterior through said at least one vent opening.

14. The apparatus according to claim 13 wherein the chopper housing includes two side walls and wherein the at least one vent opening includes a vent opening in each side wall.

15. The apparatus according to claim 13 wherein the side walls each include a mounting flange at its top edge for attachment to the bottom of the rear hood and wherein the vent openings include a plurality of horizontal slots at spaced positions directly below the mounting flange.

16. The apparatus according to claim 13 wherein the chopper housing includes a rear wall extending transversely across the rear hood and wherein there is a vent opening in the rear wall.

17. The apparatus according to claim 16 wherein the vent opening includes a plurality of horizontal slots.

18. The apparatus according to claim 13 wherein the at least one vent opening includes a plurality of louvers.

19. The apparatus according to claim 18 wherein the louvers are arranged such that they are inclined upwardly and outwardly so as to be angled opposite to the downward direction of flow of the straw.

20. The apparatus according to claim 13 further including a pneumatic fan having a duct connected to the at least one vent opening for driving air through the at least one vent opening.

21. The apparatus according to claim 20 further including an outlet duct of the fan arranged to transport the air from the fan to be mixed with the air stream from the rotor.

22. A combine harvester comprising:

a housing;

a straw separating system mounted within the housing for separating seed materials from straw for collection of the seed materials and for transport of the straw toward the outlet of the housing for discharge;

the housing having a rear hood with walls defining a hollow interior, and separating the hollow interior from an exterior of the combine harvester, into which hollow interior straw from the separating system is fed and with a bottom opening in the rear hood for discharge of the straw from the hollow interior of the rear hood;

a straw chopper mounted at the hood for receiving the straw for chopping the straw and for generating a an air stream for spreading the chopped straw;

the straw chopper having a transverse hub rotatable about a transverse axis and carrying a plurality of axially spaced blades for rotation with the hub about the axis so as to define an imaginary vertical plane parallel to and in front of the axis which is the forwardmost plane which tips of the blades reach;

the straw chopper having a chopper housing an inlet opening at the rotor for receiving straw moving downstream from the hollow interior of the rear hood and an outlet opening angularly spaced around the rotor from the inlet opening for discharge of the chopped straw in the air stream;

and at least one vent opening having at least a portion thereof rearward of said imaginary vertical plane and arranged to allow air to pass between the hollow interior of the rear hood at a position upstream of the inlet opening and the exterior through said at least one vent opening.

23. The combine harvester according to claim 22 wherein the at least one vent opening is located in a wall of the rear hood adjacent the straw chopper.

24. The combine harvester according to claim 22 wherein the at least one vent opening includes a first and a second vent opening each arranged in a respective side wall of the rear hood adjacent the straw chopper.

25. The combine harvester according to claim 22 wherein the chopper housing includes housing walls attached to the rear hood and depending therefrom and wherein the at least one vent opening is located in a respective one of the chopper housing walls.

26. The combine harvester according to claim 25 wherein the chopper housing walls include two side walls and wherein there is a respective one of the vent openings in each side wall.

27. The combine harvester according to claim 26 wherein each side wall includes a mounting flange at its top edge for attachment to the bottom of the hood and wherein the at least one vent opening includes a plurality of horizontal slots at spaced positions directly below the mounting flange.

28. The combine harvester according to claim 22 wherein the chopper housing includes a rear wall extending transversely across the hood and wherein the at least one of the vent opening includes a vent opening in the rear wall.

29. The combine harvester according to claim 28 wherein the vent chopping in the rear wall includes a plurality of horizontal slots.

30. The combine harvester according to claim 22 wherein the at least one vent opening includes a plurality of louvers.

31. The combine harvester according to claim 30 wherein the louvers are arranged such that they are inclined upwardly and outwardly so as to be angled opposite to the downward direction of flow of the straw.

32. The combine harvester according to claim 22 wherein there is provided a pneumatic fan having a duct connected to the at least one vent opening for driving air through the at least one vent opening.

33. The combine harvester according to claim 32 wherein the fan has an outlet duct which transports the air from the fan to be mixed with the air stream from the rotor.

34. The combine harvester according to claim 22 wherein the at least one vent opening includes a plurality of horizontal slots and wherein at least some of the slots have at least a part of their length rearward of the imaginary plane.

35. A combine harvester comprising:

a housing;

a straw separating system mounted within the housing for separating seed materials from straw for collection of the seed materials and for transport of the straw rearwardly toward a rear of the housing for discharge;

the housing having side walls defining a hollow interior, and separating the hollow interior from an exterior of the combine harvester, into which hollow interior straw from the separating system is fed and with an opening for discharge of the straw from the hollow interior;

a straw chopper for receiving the straw from the hollow interior;

the straw chopper having a generally cylindrical rotor with a hub mounted for rotation about a horizontal axis and carrying blades for chopping the straw and for generating an air stream for spreading the chopped straw;

the straw chopper defining an inlet opening at the rotor for receiving straw moving downstream from the hollow interior of the rear hood and an outlet opening angularly spaced around the rotor from the inlet opening for discharge of the chopped straw in the air stream;

and at least one vent opening in at least one of the side walls of the housing arranged to allow air to pass between the hollow interior of at a position upstream of the inlet opening and the exterior through said at least one vent opening.

36. The combine harvester according to claim 35 wherein there is a respective one of the vent opening in each side wall.

37. The combine harvester according to claim 35 wherein the at least one vent opening includes a plurality of louvers.

38. The combine harvester according to claim 37 wherein the louvers are arranged such that they are inclined upwardly and outwardly.

39. The combine harvester according to claim 35 wherein the there is provided a pneumatic fan having a duct connected to the at least one vent opening for driving air through the at least one vent opening.

40. The combine harvester according to claim 39 wherein the fan has an outlet duct which transports the air from the fan to be mixed with the air stream from the rotor.

* * * * *